United States Patent
Fink-Straube et al.

(10) Patent No.: US 9,399,206 B2
(45) Date of Patent: Jul. 26, 2016

(54) PROCESS FOR PRODUCING ENCAPSULATED METAL COLLOIDS AS INORGANIC COLOURED PIGMENTS

(75) Inventors: Claudia Fink-Straube, Saarbrucken (DE); Kira Fries, Neunkirchen (DE); Martin Mennig, Quierschied (DE); Dieter Anschutz, Elversberg (DE); Sarah Schumacher, Saarbrucken (DE); Peter William De Oliveira, Saarbrucken (DE); Masahiko Ishii, Okazaki (JP); Wataru Murata, Nagoya (JP); Veronique Vandenberghe, Zaventem (BE)

(73) Assignee: TOYOTA MOTOR CORPORATION, Toyota (JP)

( * ) Notice: Subject to any disclaimer, the term of this patent is extended or adjusted under 35 U.S.C. 154(b) by 771 days.

(21) Appl. No.: 13/514,484

(22) PCT Filed: Dec. 15, 2010

(86) PCT No.: PCT/EP2010/007635
§ 371 (c)(1),
(2), (4) Date: Jun. 7, 2012

(87) PCT Pub. No.: WO2011/079909
PCT Pub. Date: Jul. 7, 2011

(65) Prior Publication Data
US 2012/0266780 A1    Oct. 25, 2012

(30) Foreign Application Priority Data
Dec. 18, 2009  (DE) .................. 10 2009 059 102

(51) Int. Cl.
C09C 1/28 (2006.01)
B29B 9/10 (2006.01)
B01J 13/00 (2006.01)

(52) U.S. Cl.
CPC .......... B01J 13/0043 (2013.01); B01J 13/0091 (2013.01)

(58) Field of Classification Search
CPC ........ C08L 83/04; B82Y 30/00; B82Y 20/00; B82Y 10/00; B82Y 40/00; B82Y 15/00; B82Y 5/00; C09D 183/04; C09D 5/1637; C09D 11/101; C09D 7/1291; G02B 1/105; B05D 1/10; B05D 1/12; B22F 1/0018
USPC ......... 106/435, 489, 457, 403, 419, 401, 417, 106/432, 434, 436; 428/363, 404, 403, 331, 428/402–402.24, 407, 321.1, 474.4; 427/219, 215, 216, 389.9, 212, 427/213–213.36, 483, 256; 264/7, 534, 5, 264/41, 4–4.7
See application file for complete search history.

(56) References Cited

U.S. PATENT DOCUMENTS 6,048,910 A * 4/2000 Furuya et al. ................... 522/86
6,136,083 A * 10/2000 Schmidt et al. ............... 106/403

FOREIGN PATENT DOCUMENTS

| | | |
|---|---|---|
| DE | 195 20 964 A1 | 12/1996 |
| EP | 0 501 139 A1 | 9/1992 |
| JP | A-55-160061 | 12/1980 |
| JP | A-05-025031 | 2/1993 |
| JP | A-11-12488 | 1/1999 |
| JP | A-11-507412 | 6/1999 |
| JP | A-2001-288383 | 10/2001 |
| JP | A-2003-342496 | 12/2003 |
| JP | A-2006-052238 | 2/2006 |
| JP | A-2009-058871 | 3/2009 |
| WO | WO 95/13249 A1 | 5/1995 |
| WO | WO 96/41840 A1 | 12/1996 |
| WO | WO 01/30921 A1 | 5/2001 |
| WO | WO 01/60740 A2 | 8/2001 |

OTHER PUBLICATIONS

International Search Report issued International Application No. PCT/EP2010/007635 dated Sep. 2, 2011.
Jun. 19, 2012 International Preliminary Report on Patentability issued in International Patent Application No. PCT/EP2010/007635 (with translation).

* cited by examiner

*Primary Examiner* — Ling Choi
*Assistant Examiner* — S. Camilla Pourbohloul
(74) *Attorney, Agent, or Firm* — Oliff PLC

(57) ABSTRACT

A process for producing encapsulated metal colloids useful as inorganic colored pigments, including, reacting one or more glass-forming components according to the sol-gel process to obtain a sol dispersing a metal salt in the resulting sol in the presence of an additional reducing agent to form metal colloids, converting the resulting dispersion into xerogel-encapsulated metal colloids by spray drying, heating the resulting xerogel-encapsulated metal colloids to density them. The present invention relates, furthermore, to inorganic colored pigments, in particular producible by the process of the invention, including metal colloids produced from metal salts and encapsulated in an encapsulation, the encapsulation being produced from glass-forming components according to the sol-gel process and being densified to a xerogel or glass, the proportion of metal colloid in the capsules being at least 80%.

8 Claims, No Drawings

PROCESS FOR PRODUCING ENCAPSULATED METAL COLLOIDS AS INORGANIC COLOURED PIGMENTS

FIELD OF THE INVENTION

The present invention relates to a process for producing encapsulated metal colloids as inorganic coloured pigments.

PRIOR ART

Inorganic coloured pigments are known from the prior art and are described in numerous patent specifications. They are commonly produced by coating the surfaces of mica, glass flakes or glass powder. In certain cases the inorganic pigments are based on metal oxides. In many cases the pigment cores are transparent, planar or flaky and single-layered or multi-layered, in order to obtain particular optical effects in the coatings, paints, inks, etc.

JP 55160061 A (1980) describes an aqueous dispersion of particles, comprising water-soluble metal salts, which is treated with reducing agents (cane sugar, glucose, aldehyde) in order to obtain pigments having a metallic lustre (e.g. silver-coated glass flakes).

JP 11012488 A (1999) describes yellowish pigments with multi-layer metal oxide coatings and their production. Optionally these pigments include a silver film between the particles and the coatings.

JP 2001288383 A (2001) describes the production of thin inorganic materials coated with metal oxide. The materials claimed are produced by spray-drying an aqueous suspension comprising inorganic flaky components (mica) and metal oxide particles, and by calcining, to give flakes with a silvery pearl-like lustre.

JP 2003342496 A (2003) describes $SiO_2$-coated gold nanoparticles, their production, and their red pigments with a sharply defined transparent hue.

EP 501139 (1992) describes a purple pigment having a colloidal gold coating optionally modified with other metals (Ag, Cu, Co, Ni, Sn, Ru, Rh, Pd, Os, Ir, Pt) or mixtures, production thereof and use thereof.

WO 01/30921 (2001) describes the production of multi-layer mica platelets, by coating mica platelets with $Fe_2O_3$—$TiO_2$—$Al_2O_3$, $SiO_2$, $TiO_2$ and $Fe_2O_3$ and calcining at 850° C., to give a gold-coloured pigment with an intense colour, high opacity and strong lustre.

A disadvantage of the pigments stated above from the prior art is that they have an inadequate tinting power and a relatively low opacity. Furthermore, many of the stated pigments are difficult to produce or to reproduce.

WO 95/13249 (1995) describes a process for producing functional glass-like layers which are coloured by metal colloids produced in situ. The coatings are applied to a substrate and subjected to thermal compaction in order to form a glass-like layer.

A disadvantage of these coatings lies in the limited UV stability. Furthermore, the metal colloids specified there are not suitable for plastic materials, dyes or paints.

WO 96/41840 (1996) describes inorganic pigments which have been coated with xerogels or glasses which can be produced by a sol-gel process and a spray-drying step.

A disadvantage of these inorganic pigments lies primarily in the inadequate UV stability and inadequate colour fastness.

Problem Addressed

The problem addressed by the present invention is that of providing coloured pigments which overcome the disadvantages of the pigments from the prior art. The problem addressed by the invention more particularly is that of providing pigments for coating systems that achieve high transparency, high chromaticity and high colour fastness and also high UV stability.

Solution

This problem is solved by the inventions with the features of the independent claims. Advantageous developments of the inventions are characterized in the subclaims. The wording of all the claims is hereby made part of this description, by reference. The invention also encompasses all meaningful combinations, and more particularly all stated combinations, of independent and/or dependent claims.

Individual steps of the process are described in more detail below. The steps need not necessarily be carried out in the order stated, and the process to be outlined may also feature further, unspecified steps.

For the purpose of solving the problem stated above, a process is proposed for producing encapsulated metal colloids useful as inorganic coloured pigments which is characterized by the steps of:

a) reacting one or more glass-forming components according to the sol-gel process to obtain a sol;
b) dispersing a metal salt in the resulting sol in the presence of an additional reducing agent to form metal colloids;
c) converting the resulting dispersion into xerogel-encapsulated metal colloids by spray drying;
d) heating the resulting xerogel-encapsulated metal colloids to densify them.

The process of the invention produces, surprisingly, inorganic coloured pigments (for example for paints) which in coating systems lead to increased chromaticity, high colour fastness and improved transparency. The pigments obtained by the process of the invention have a defined particle size and size distribution and can be dispersed, for example, into coating systems through use of ultrasound. The resulting coatings feature high UV stability, high colour fastness and high transparency. The encapsulation defines the diameter of the coloured pigments. It also protects the metal colloids from oxidation. The inorganic, glass-like encapsulation lies closely against the metal colloid cores.

The fact that the dispersing of the metal salt in the resulting sol (step b) takes place in the presence of an additional reducing agent has the effect that the metal salt is converted almost completely into metal colloid. This in turn contributes to the high UV stability of the resulting pigments.

A further great advantage of the present invention lies in the high temperature stability of the coatings featuring the colour pigments obtainable by the process of the invention.

Advantageously, the dispersion obtained in step b) of the process of the invention is subjected to a UV treatment. The UV treatment produces even better UV stability of the inorganic coloured pigments obtained by the process of the invention.

The sol in step a) of the process of the invention is preferably obtainable by hydrolysis and polycondensation of (A) at least one hydrolysable silane of the general formula (I)

$$SiX_4 \tag{I}$$

where the radicals X are the same or different and represent hydrolysable groups or hydroxyl groups, or an oligomer derived therefrom,
and (B) at least one organosilane of the general formula (II)

$$R^1_a R^2_b SiX_{(4-a-b)} \tag{II}$$

where $R^1$ is a non-hydrolysable group, $R^2$ is a radical bearing a functional group, X is as defined above and a and b are each 0, 1, 2 or 3 provided the sum (a+b) is 1, 2 or 3, or an oligomer derived therefrom in an amount of substance ratio for (A):(B) of 5-50:50-95, and also (C) optionally one or more compounds of glass-forming elements.

This sol which is used as an encapsulating agent for the metal colloids has the advantage, for example, that it can be subjected to thermal densification at high temperatures despite having a relatively high fraction of organic components. In the course of that operation there is a continual transition from an organically modified glass to a purely inorganic $SiO_2$ glass. The metal colloid encapsulated in this material retains its function (e.g. light absorption) and results, when incorporated into a coating system, in glasslike coatings with intense colouration. The possibility of thermal densification at relatively high temperatures permits the production of crack-free coatings of high thermal, mechanical and chemical stability on a variety of surfaces.

Advantageously tetraalkoxysilanes are used as hydrolysable silanes (A). The alkoxy groups are preferably $C_{1-6}$ alkoxy groups, such as methoxy, ethoxy, n-propoxy, i-propoxy and butoxy groups, for example.

The non-hydrolysable radical $R^1$ of the organosilane stated above, of the general formula (II), is, for example, alkyl (preferably alkyl, such as methyl, ethyl, n-propyl, isopropyl, n-butyl, s-butyl and t-butyl, pentyl, hexyl or cyclohexyl), alkenyl (preferably $C_{2-6}$ alkenyl, such as vinyl, 1-propenyl, 2-propenyl and butenyl), alkynyl (preferably $C_{2-6}$ alkynyl, such as acetylenyl and propargyl) and aryl (preferably $C_{6-10}$ aryl, such as phenyl and naphthyl). The stated radicals $R^1$ and X may optionally have one or more typical substitutes, such as halogen or alkoxy, for example.

Specific examples of the functional groups of the radical $R^2$ are the epoxy, hydroxy, ether, amino, monoalkylamino, dialkylamino, amide, carboxyl, mercapto, thioether; vinyl, acryloyloxy, methacryloyloxy, cyano, halogen, aldehyde, alkylcarbonyl, sulphonic acid and phosphoric acid groups. These functional groups are attached to the silicon atom via alkylene, alkenylene or arylene bridging groups, which may be interrupted by oxygen or sulphur atoms or NH groups. The stated bridging groups are derived, for example, from the alkyl, alkenyl or aryl radicals stated above. The radicals $R^2$ contain preferably 1 to 18, more particularly 1 to 8, carbon atoms.

In the general formula (II) a preferably is 0, 1 or 2, b preferably is 1 or 2, and the sum (a+b) is preferably 1 or 2.

Particularly preferred hydrolysable silanes (A) are tetraalkoxysilanes, such as tetraethoxysilane (TEOS).

Particularly preferred organosilanes are epoxysilanes, such as 3-glycidyloxypropyltrimethoxysilane (GPTS) and aminosilanes such as 3-aminopropyltriethoxysilane and 3-(aminoethylamino)propyltriethoxysilane (DIAMO).

The amount of substance ratio of the hydrolysable silane (A) to the organosilane (B) is 5 to 50:50 to 95, preferably 15 to 25:75 to 85.

The optional component (C) is preferably soluble or dispersible in the reaction medium. Use may be made of, for example, compounds (halides, alkoxides, carboxylates, chelates, etc.) of lithium, sodium, potassium, rubidium, caesium, beryllium, magnesium, calcium, strontium, barium, boron, aluminium, titanium, zirconium, tin, zinc or vanadium. The hydrolysis and polycondensation are carried out either in the absence of a solvent or, preferably, in an aqueous or aqueous/organic reaction medium, optionally in the presence of an acidic or basic condensation catalyst such as HCl, $HNO_3$ or $NH_3$. When a liquid reaction medium is used, the starting components are soluble in the reaction medium. Particularly suitable organic solvents are water-miscible solvents, examples being mono- or polyfunctional aliphatic alcohols, ethers, esters, ketones, amides, sulphoxides and sulphones.

Advantageously, epoxysilanes or aminosilanes are used as organosilanes (B).

Advantageously, the hydrolysis and polycondensation of the abovementioned components are carried out in the presence of a complexing agent, such as in the presence of nitrates, β-dicarbonyl compounds (e.g. acetylacetonates or acetoacetic esters), carboxylic acids (e.g. methacrylic acid) or carboxylates (e.g. acetate, citrate or glycolate), betaines, diols, diamines (e.g. DIAMO) or crown ethers.

In one particularly preferred version of the process of the invention the refractive index of the sol obtainable in step a) is adapted, preferably using $B_2O_3$, to the respective use. The process of the invention affords the possibility of modifying the encapsulation composition in order to control the optical properties of the resulting coatings. Thus one objective, for example, is to adapt the refractive index such that the encapsulation is invisible in the coating. Differences in refractive index between the polymer and the glass composite can lead to disruptive scattering phenomena. Furthermore, altering the refractive index of the encapsulation material produces different specific optical effects.

Advantageously, the metal salts used, which are preferably in complexed form, are selected from the group consisting of metal nitrates, metal halides, metal carbides, metal nitrides, metal arsenides, metal phosphides and metal chalcogenides.

The metal salts are preferably selected from the group consisting of salts of silver, of gold, of copper, of iron, of lead, of palladium and of platinum.

The additional reducing agent used in step b) is preferably at least one from the group consisting of glucose, ascorbic acid, formaldehyde, glycerol, hexamethylenetetraamine, methoxypolyethylene glycol, hydroquinone and urea. These compounds produce a virtually complete conversion of the metal salts used into metal colloids, which leads in turn to a considerable increase in the UV stability of the coloured pigments obtained.

In one preferred version of the process of the invention the xerogel-encapsulated metal colloids obtained are heated to up to 775° C. This is done preferably at a speed of 2 K/min and advantageously is carried out for three hours under a nitrogen atmosphere. Prior to heating to 775° C., the xerogel-encapsulated metal colloids are preferably heated under an air atmosphere at 500° C. for three hours. This temperature too is preferably obtained at a speed of 2 K/min.

The uncoated metal colloid particles preferably have a diameter of 5-25 nm. The size of the metal colloids can be controlled primarily through the treatment at high temperature (e.g. 775° C.)

The encapsulated metal colloids preferably have a particle size between 50 nm and 2 µm, more preferably between 100 nm and 1.5 µm, for example about 1 µm or 1 µm (as measured with HREM). The size of these particles can be controlled primarily by altering the parameters in the spray drying operation and in the sol system.

The additional reducing agent is preferably used in equal molar ratio and/or molar excess compared to the metal salt, for example between 1:1 to 1:100 (molar ratio of the metal ion to be reduced and the additional reducing agent) or 1:2 to 1:100. But also a lower molecular ratio of between 1:0.01 to 1:1 or 1:0.1 to 1:0.5 may be used. The following ratios are examples for different reducing agents (Glucose 1:1 to 1:10; Ascorbic acid 1:0.1 to 1:10; Formaldehyde 1:1 to 1:100, preferably 1:1 to 1:10; Hexamethylenetetraamine 1:1 to 1:10; Methoxypolyethylene glycol 1:1 to 1:10; Hydroquinone 1:1 to 1:10 or Urea 1:1 to 1:10). Also combinations of two or more reducing agents may be used, wherein their added molecular ratios lead to the rations mentioned above, for example Ag, Hydroquinone and Ascorbic acid in a ratio from 1:2:1 to 1:1:2, preferably 1:1:1, or Ag, Hydroquinone and Formaldehyde 1:1:0.2 to 1:1:1, preferably 1:1:0.5.

The present invention relates, furthermore, to inorganic coloured pigments, in particular producible by the above-stated process of the invention, comprising metal colloids produced from metal salts and encapsulated in an encapsulation, the encapsulation being produced from glass-forming components according to the sol-gel process and being densified to a xerogel or glass, the proportion of metal colloid in the capsules being at least 80%, preferably at least 95% and more preferably almost 100%. The high proportion of metal colloids in the capsules of the coloured pigments of the invention produces a particularly high UV stability and also a high temperature stability on the part of these coloured pigments. The high UV stability of the coloured pigments of the invention and, respectively, of the coatings provided with the coloured pigments of the invention has been demonstrated, for example, by means of weathering tests or UV-VIS spectroscopy. In the weathering test on the coatings containing the coloured pigments of the invention, no fading of the colour was observed at all. However, strong UV irradiation led to a slight increase in the intensity of the colour of the coatings, which can be attributed to conversion of any metal salt still present in the capsules into metal colloid. Furthermore, the coatings which contain coloured pigments of the invention exhibit high transparency, high chromaticity and increased colour fastness. Moreover, the materials used for producing the coloured pigments of the invention are in general non-toxic and environmentally friendly.

Further details and features emerge from the description below of preferred exemplary embodiments in conjunction with the subclaims. In this context the respective features may be realized alone or in a plurality in combination with one another. The possibilities for solving the problem are not limited to the exemplary embodiments. Thus, for example, ranges always encompass all of the values in between—not stated—and all conceivable sub-ranges. Numerous modifications and developments of the exemplary embodiments described can be realized.

Example of a Weathering Test Conducted

"Xenon Light Arc Weathering Test":
  Test Conditions:
  Equipment: Atlas Ci 4000
  Operating cycles: 102 minutes irradiation, 18 minutes irradiation+rain;
  Light intensity (300-400 nm): 60 W/m²;
  Dry phase: 63° C., 50% relative humidity;
  Rain phase: 45° C., 95% relative humidity;
  Spraying rate: 200 ml/min.

The test lasted 1000 hours for coloured coatings on glass plates; the L*, a* and b* values were measured by UV-VIS spectroscopy before, during and after the weathering test.

The encapsulation of the inorganic coloured pigments of the invention is preferably obtainable by hydrolysis and polycondensation of (D) at least one hydrolysable silane of the general formula (I)

$$SiX_4 \tag{I}$$

where the radicals X are the same or different and represent hydrolysable groups or hydroxyl groups, or an oligomer derived therefrom,
and
(E) at least one organosilane of the general formula (II)

$$R^1_a R^2_b SiX_{(4-a-b)} \tag{II}$$

where $R^1$ is a non-hydrolysable group, $R^2$ is a radical bearing a functional group, X is as defined above and a and b are each 0, 1, 2 or 3 provided the sum (a+b) is 1, 2 or 3, or an oligomer derived therefrom
in an amount of substance ratio for (A):(B) of 5-50:50-95, and also
(F) optionally one or more compounds of glass-forming elements.

Advantageously, tetraalkoxysilanes are used as hydrolysable silanes (A). The alkoxy groups are preferably $C_{1-6}$ alkoxy groups, such as methoxy, ethoxy, n-propoxy, i-propoxy and butoxy groups, for example.

The non-hydrolysable radical $R^1$ of the organosilane stated above, of the general formula (II), is, for example, alkyl (preferably $C_{1-6}$ alkyl, such as methyl, ethyl, n-propyl, isopropyl, n-butyl, s-butyl and t-butyl, pentyl, hexyl or cyclohexyl), alkenyl (preferably $C_{2-6}$ alkenyl, such as vinyl, 1-propenyl, 2-propenyl and butenyl), alkynyl (preferably $C_{2-6}$ alkynyl, such as acetylenyl and propargyl) and aryl (preferably $C_{6-10}$ aryl, such as phenyl and naphthyl). The stated radicals $R^1$ and X may optionally have one or more typical substituents, such as halogen or alkoxy, for example.

Specific examples of the functional groups of the radical $R^2$ are the epoxy, hydroxy, ether, amino, monoalkylamino, dialkylamino, amide, carboxyl, mercapto, thioether, vinyl, acryloyloxy, methacryloyloxy, cyano, halogen, aldehyde, alkylcarbonyl, sulphonic acid and phosphoric acid groups. These functional groups are attached to the silicon atom via alkylene, alkenylene or arylene bridging groups, which may be interrupted by oxygen or sulphur atoms or NH groups. The stated bridging groups are derived, for example, from the alkyl, alkenyl or aryl radicals stated above. The radicals $R^2$ contain preferably 1 to 18, more particularly 1 to 8, carbon atoms.

In the general formula (II) a preferably is 0, 1 or 2, b preferably is 1 or 2, and the sum (a+b) is preferably 1 or 2.

Particularly preferred hydrolysable silanes (A) are tetraalkoxysilanes, such as tetraethoxysilane (TEOS). Particularly preferred organosilanes are epoxysilanes, such as 3-glycidyloxypropyltrimethoxysilane (GPTS) and aminosilanes such as 3-aminopropyltriethoxysilane and 3-(aminoethylamino)propyltriethoxysilane (DIAMO).

The amount of substance ratio of the hydrolysable silane (A) to the organosilane (B) is 5 to 50:50 to 95, preferably 15 to 25:75 to 85.

The optional component (C) is preferably soluble or dispersible in the reaction medium. Use may be made of, for example, compounds (halides, alkoxides, carboxylates, chelates, etc.) of lithium, sodium, potassium, rubidium, caesium, beryllium, magnesium, calcium, strontium, barium, boron, aluminium, titanium, zirconium, tin, zinc or vanadium. The hydrolysis and polycondensation are carried out either in the absence of a solvent or, preferably, in an aqueous or aqueous/organic reaction medium, optionally in the presence of an acidic or basic condensation catalyst such as HCl, $HNO_3$ or $NH_3$. When a liquid reaction medium is used the starting components are soluble in the reaction medium. Particularly suitable organic solvents are water-miscible solvents, examples being mono- or polyfunctional aliphatic alcohols, ethers, esters, ketones, amides, sulphoxides and sulphones.

Advantageously, epoxysilanes or aminosilanes are used as organosilanes (B).

Preferably the hydrolysis and polycondensation are carried out in the presence of a complexing agent, such as in the presence of nitrates, β-dicarbonyl compounds (e.g. acetylacetonates or acetoacetic esters), carboxylic acids (e.g. methacrylic acid) or carboxylates (e.g. acetate, citrate or glycolate), betaines, diols, diamines (e.g. DIAMO) or crown ethers.

Preferably the metal salts, which are preferably in complexed form, are selected from the group consisting of metal nitrates, metal halides, metal carbides, metal nitrides, metal arsenides, metal phosphides and metal chalcogenides.

The metal salts are preferably selected from the group consisting of salts of silver, of gold, of copper, of iron, of lead, of palladium and of platinum.

The uncoated metal colloid particles preferably have a diameter of 5-25 nm. The size of the metal colloids can be controlled primarily through the treatment at high temperature (e.g. 775° C.).

The encapsulated metal colloids preferably have a particle size between 50 nm and 2 μm, more preferably between 100 nm and 1.5 μm, for example about 1 μm or 1 μm (as measured with HREM). The size of these particles can be controlled primarily by altering the parameters in the spray drying operation and in the sol system.

The present invention further relates to the use of the inorganic coloured pigments of the invention, producible in particular by the process of the invention as stated above, in coating systems.

EXAMPLES

1. Production of SiO$_2$-Encapsulated Ag Colloids in the Nanoscale Range as Yellow Pigment Powder a) Base Sol System with AgNO$_3$
Starting Materials:
166 ml ethanol
34.2 ml 3-glycidyloxypropyltrimethoxysilane (GPTS)
8.5 ml tetraethoxysilane (TEOS)
6.3 ml 0.1 M nitric acid
5.2 g tetraethyl borate (TEB)
1.47 g silver nitrate
2.5 ml distilled water
6.25 ml [3-(2-aminoethylamino)propyl]trimethoxysilane (DIAMO)

34.2 ml of GPTS and 8.5 ml of TEOS are mixed with 25.5 ml of ethanol in a 250 ml three-necked flask with a reflux condenser and a dropping funnel. Then 6.3 ml of 0.1 M nitric acid are added slowly dropwise to the mixture and the resulting mixture is heated under reflux for five hours. The resulting pre-hydrolysed GPTS/TEOS sol is dissolved with 125.5 ml of ethanol, and then 5.2 g of TEB are added and dissolved at room temperature.

In a second mixture, 1.47 g of silver nitrate are dissolved in 2.5 ml of distilled water and 15 ml of ethanol in a 100 ml two-necked flask and 6.25 ml of DIAMO are added slowly with vigorous stirring.

This silver-containing solution is immediately added dropwise to the GPTS/TEOS/TEB sol system at room temperature and heated at 50° C. for sixteen hours. During this heat treatment the colour of the overall mixture changes from pale yellow to a dark transparent brown.

After cooling to room temperature, this sol system is spray-dried using a Büchi B-191 mini-spray drier. The inlet temperature of the spray drier was 170° C. and the outlet temperature was 109° C.

The resulting yellow-brownish xerogel powder is introduced into an Alsinite-ceramic crucible and heat-treated with a temperature program in order to burn off the organic compounds in a closed Nabertherm oven.

First the xerogel is heated to 500° C. at a rate of 2 K/min and this temperature is maintained for three hours under an air atmosphere. This is followed by heating to 775° C. at a rate of 2 K/min, and this temperature is maintained for three hours under a nitrogen atmosphere. Thereafter the material is cooled to room temperature in the closed oven. The resulting nanoscale, inorganic, SiO$_2$-encapsulated Ag pigments have a yellowish colour.

b) Base Sol System with AgNO$_3$, Additional Reducing Agent
Starting Materials
170 ml ethanol
34.2 ml 3-glycidyloxypropyltrimethoxysilane (GPTS)
8.5 ml tetraethoxysilane (TEOS)
6.3 ml 0.1 M nitric acid
5.2 g tetraethyl borate (TEB)
1.47 g silver nitrate
2.5 ml distilled water
6.25 ml [3-(2-aminoethylamino)propyl]trimethoxysilane (DIAMO)
0.95 g hydroquinone.

The GPTS/TEOS/TEB sol system is produced as described above. The second mixture with silver nitrate and DIAMO is also produced as described above and added immediately dropwise to the GPTS/TEOS/TEB sol system at room temperature and heated at 50° C. for sixteen hours. During this temperature the colour of the overall mixture changes from pale yellow to a dark transparent brown. Following cooling to room temperature, 0.95 g of hydroquinone as reducing agent (as a solution in 4 ml of ethanol) is added and the mixture is stirred for 30 minutes. The Ag:reducing agent molar ratio in this case is 1:1. Then this complete sol system is spray-dried using a Büchi B-191 mini-spray drier and employing the spray-drying parameters specified above. The resulting yellow-brownish xerogel powder is also densified as described above. The resulting nanoscale, inorganic, SiO$_2$-encapsulated Ag pigment has a yellowish colouration.

Reducing Agents Tested:
Glucose Ag:reducing agent molar ratio=1:1 and 1:10
Ascorbic acid Ag:reducing agent molar ratio=1:1 and 1:5
Formaldehyde Ag:reducing agent molar ratio=1:1
Glycerol Ag:reducing agent molar ratio=1:1 and 1:5
Hexamethylenetetraamine Ag:reducing agent molar ratio=1:1
Methoxypolyethylene glycol Ag:reducing agent molar ratio=1:1
Hydroquinone Ag:reducing agent molar ratio=1:1 and 1:2 and 1:5
Urea Ag:reducing agent molar ratio=1:4 c) Base Sol System with AgNO$_3$, Additional UV Treatment
Starting Materials:
166 ml ethanol
34.2 ml 3-glycidyloxypropyltrimethoxysilane (GPTS)
8.5 ml tetraethoxysilane (TEOS)
6.3 ml 0.1 M nitric acid
5.2 g tetraethyl borate (TEB)
1.47 g silver nitrate
2.5 ml distilled water
6.25 ml [3-(2-aminoethylamino)propyl]trimethoxysilane (DIAMO)

The GPTS/TEOS/TEB sol system is produced as described above. The second mixture with silver nitrate and DIAMO is also produced as described above and added immediately dropwise to the GPTS/TEOS/TEB sol system at room temperature and the mixture is immediately treated for an hour with UV irradiation, during which it is stirred, using a xenon lamp (Oriel, 100 W), the UV intensity on the glass surface of the flask containing the mixture being variable from 1 to 4 mW/cm$^2$ (measured at 360 nm). The sol components TEB and/or DIAMO reacted as mild reducing agents for silver nitrate, but the formation of Ag colloid was very slow. This experiment was investigated only by UV-VIS spectroscopy, but not for the production of pigments by spray drying (owing to the slow reduction of the silver nitrate).

d) Base Sol System with AgNO$_3$, Additional Reducing Agent and UV Treatment

Starting Materials:
170 ml ethanol
34.2 ml 3-glycidyloxypropyltrimethoxysilane (GPTS)
8.5 ml tetraethoxysilane (TEOS)
6.3 ml 0.1 M nitric acid
5.2 g tetraethyl borate (TEB)
1.47 g silver nitrate
2.5 ml distilled water
6.25 ml [3-(2-aminoethylamino)propyl]trimethoxysilane (DIAMO)
0.95 g hydroquinone.

The GPTS/TEOS/TEB sol system is produced as described above. The second mixture of silver nitrate and DIAMO is also produced as described above and added immediately dropwise to the GPTS/TEOS/TEB sol system at room temperature and the mixture is immediately treated for about two hours with UV irradiation, with stirring of the mixture, and using a xenon lamp (Oriel, 100 W), the UV intensity on the glass surface of the flask containing the mixture being variable from 1 to 4 mW/cm$^2$ (measured at 360 nm). After one hour of UV treatment, 0.95 g of the hydroquinone reducing agent (as a solution in 4 ml of ethanol); Ag:reducing agent molar ratio=1:1) is added with further UV irradiation of the sol system and stirring for approximately 45 minutes under these conditions. Then this complete sol system is spray-dried as described above. The resulting yellow-brownish xerogel powder is densified likewise as described above. The resulting nanoscale, inorganic, SiO$_2$-encapsulated Ag pigment has a yellowish colouration.

Reducing Agents Tested:
Hydroquinone Ag:reducing agent molar ratio=1:1 and 1:5
Glucose Ag:reducing agent molar ratio=1:1
Ascorbic acid Ag:reducing agent molar ratio=1:1 and 1:0.2
Formaldehyde Ag:reducing agent molar ratio=1:9, 1:18, 1:45 and 1:90 e) Base Sol System with AgNO$_3$, Additional Reducing Agents in Combination

Starting Materials:
170 ml ethanol
34.2 ml 3-glycidyloxypropyltrimethoxysilane (GPTS)
8.5 ml tetraethoxysilane (TEOS)
6.3 ml 0.1 M nitric acid
5.2 g tetraethyl borate (TEB)
1.47 g silver nitrate
2.5 ml distilled water
6.25 ml [3-(2-aminoethylamino)propyl]trimethoxysilane (DIAMO)
0.95 g hydroquinone
1.52 g ascorbic acid The GPTS/TEOS/TEB sol system is produced as described above. The second mixture with silver nitrate and DIAMO is also produced as described above and added immediately dropwise to the GPTS/TEOS/TEB sol system at room temperature and heated at 50° C. for sixteen hours. During this heat treatment the colour of the overall mixture changes from pale yellow to a dark transparent brown. Following cooling to room temperature, 0.95 g of hydroquinone and 1.52 g of ascorbic acid (as a solution in 4 ml of ethanol) was added and the mixture was stirred for 30 minutes. The Ag:hydroquinone:ascorbic acid molar ratio is 1:1:1. Then the complete sol system is spray-dried using a Büchi B-191 mini-spray drier and employing the spray-drying parameters specified above. The resulting yellow-brownish xerogel powder was also densified as described above. The resulting nanoscale, inorganic, SiO$_2$-encapsulated Ag pigment has a yellowish colouration.

Reducing Agent Combinations Tested:
Hydroquinone+Ascorbic acid; Molar ratio Ag:hydroquinone:ascorbic acid=1:1:1
Hydroquinone+Formaldehyde; Molar ratio Ag:hydroquinone:formaldehyde=1:1:0.5.

These pigments are investigated in respect of their morphology (TEM, HREM, ESEM) and are also measured by UV-VIS spectroscopy (measurements of the diffuse reflection, conversion to absorption data using the Kubelka-Munk method).

The diameter of the unencapsulated Ag colloids (metal cores) is approximately 5-25 nm, measured by TEM, HTEM. The complete pigment (Ag with SiO$_2$) has a diameter of approximately 1 μm, measured by HREM.

2. Production of Coloured Coatings on Glass Plates

First of all approximately 6.6% by weight of Ag pigment produced is incorporated into a 2-component clearcoat system from Toyota (2K-HS clearcoat, 2K-HS curative; DuPont performance coatings). Therefore the pigment is incorporated into the 2K-HS clearcoat component using an ultrasound lance (approximately 5-10 minutes). Then the 2K-HS curative (half the amount by weight relative to the 2K-HS clearcoat component) is added and the complete mixture is stirred at room temperature for a few minutes. This yellow-coloured coating system is applied to glass plates (10 cm×10 cm) using a manual knife, with a wet film thickness of approximately 120 μm. The applied coatings are then densified at a temperature of 140° C. for 18 minutes. The hard films which result are yellowish in colour and largely transparent.

These coloured coatings are used for weathering tests, morphological investigations (TEM, HREM, ESEM) and spectroscopic investigations (UV-VIS).

The incorporation of the Ag pigments produced (without additional reducing agents) into this two-component clearcoat system was varied: 2.5%, 5%, 7.5% and 10% by weight. The resulting coloured coatings on glass plates show different colours and intensities of colour. With 2.5% by weight of Ag pigment in the clearcoat system, a pale yellow colour is obtained. Using 5% or 7.5% by weight of Ag pigment in the clearcoat system gives a luminous yellow coloured transparent coating. With 10% by weight of Ag pigment in the clearcoat system, an orange to slightly brownish colour is obtained.

In the case of Ag pigments produced using additional reducing agents and/or UV irradiation, 6.6% by weight of pigment is incorporated into the clearcoat system, leading to coatings of a luminous yellow colour. An exception is the use of urea as reducing agent (molar ratio of Ag:urea=1:4). In this case the resulting coatings are more brownish in colour.

The invention claimed is:
1. A process for producing encapsulated metal colloids useful as inorganic colored pigments comprising:
    a) reacting one or more glass-forming components according to a sol-gel process to obtain a sol;
    b) dispersing a metal salt in the resulting sol in the presence of a reducing agent to form metal colloids;

c) converting the resulting dispersion into xerogel-encapsulated metal colloids by spray drying; and
d) heating the resulting xerogel-encapsulated metal colloids to densify them, wherein the reducing agent used in step b) is at least one from the group consisting of glucose, ascorbic acid, formaldehyde, glycerol, hexamethylenetetraamine, methoxy polyethylene glycol, hydroquinone and urea, wherein the sol in step a) is obtained by hydrolysis and polycondensation of (A) at least one hydrolysable silane of the general formula (I)

$$SiX_4 \qquad (I)$$

where the X radicals are the same or different and represent hydrolysable groups or hydroxyl groups, or an oligomer derived therefrom, and (B) at least one organosilane of the general formula (II)

$$R^1_a R^2_b SiX_{(4-a-b)} \qquad (II)$$

where $R^1$ is a non-hydrolysable group, $R^2$ is a radical bearing a functional group, X is as defined above and a and b are each 0, 1, 2 or 3 provided the sum (a+b) is 1, 2 or 3, or an oligomer derived therefrom in an amount of substance ratio for (A):(B) of 5-50:50-95, and wherein tetraalkoxysilanes are used as hydrolysable silanes (A), and wherein epoxysilanes or aminosilanes are used as organosilanes (B), and wherein the metal salts are selected from the group consisting of salts of silver, of gold, of copper, of iron, of lead, of palladium and of platinum.

2. The process according to claim 1, wherein the dispersion obtained in step b) is subjected to a UV treatment.

3. The process according to claim 1, wherein the hydrolysis and polycondensation is carried out in the presence of a complexing agent.

4. The process according to claim 1, wherein the refractive index of the sol obtainable in step a) is altered using $B_2O_3$.

5. The process according to claim 1, wherein the metal salts are selected from the group consisting of metal nitrates, metal halides, metal carbides, metal nitrides, metal arsenides, metal phosphides and metal chalcogenides.

6. The process according to claim 1, wherein the xerogel-encapsulated metal colloids obtained are heated to 775° C.

7. The process according to claim 1, wherein the uncoated metal colloid cores have a diameter of 5-25 nm.

8. The process according to claim 1, wherein the encapsulated metal colloids have a particle size between 50 nm and 2 µm.

* * * * *